United States Patent [19]

Paul

[11] Patent Number: 5,054,559

[45] Date of Patent: Oct. 8, 1991

[54] SOIL-WORKING MACHINE FOR PLANTS GROWN IN ROWS

[76] Inventor: Karl-Heinz Paul, Zur Wilde 8, D - 3590 Bad Wildungen-Wega, Fed. Rep. of Germany

[21] Appl. No.: 549,462

[22] Filed: Jul. 6, 1990

[30] Foreign Application Priority Data

Jul. 8, 1989 [DE] Fed. Rep. of Germany ....... 3922565

[51] Int. Cl.⁵ ...................... A01B 33/06; A01B 33/28
[52] U.S. Cl. .................... 172/59; 172/48; 172/78; 172/111; 172/612; 172/624.5
[58] Field of Search .............. 172/48, 35, 45, 47, 172/52, 57, 59, 111, 624.5, 78; 15/87

[56] References Cited

U.S. PATENT DOCUMENTS

| | | | |
|---|---|---|---|
| 1,890,537 | 12/1932 | Frank | 172/59 |
| 2,193,157 | 3/1940 | Ayo | 172/111 |
| 2,655,678 | 10/1953 | Keogh | 15/87 |
| 2,996,742 | 8/1961 | Aimers et al. | 15/87 |
| 3,066,745 | 12/1962 | Smith et al. | 172/59 |
| 3,750,215 | 8/1973 | Liebscher | 15/87 |
| 4,127,175 | 11/1978 | van der Lely | 172/59 |
| 4,170,265 | 10/1979 | Cole | 172/624.5 |
| 4,210,209 | 7/1980 | van der Lely | 172/47 |
| 4,224,997 | 9/1980 | van der Lely | 172/59 |
| 4,235,294 | 11/1980 | Barlage | 172/48 |
| 4,323,125 | 4/1982 | Pronovost | 172/59 |
| 4,363,362 | 12/1982 | Barato | 172/59 |
| 4,461,355 | 7/1984 | Peterson et al. | 172/624.5 |
| 4,509,603 | 4/1985 | Adams | 172/624.5 |
| 4,518,043 | 5/1985 | Anderson et al. | 172/78 |
| 4,754,521 | 7/1988 | Zoni | 15/87 |
| 4,766,962 | 10/1988 | Frase | 172/624.5 |
| 4,846,084 | 7/1989 | Sigle | 172/624.5 |
| 4,911,247 | 3/1990 | Kühlmann et al. | 172/111 |
| 4,936,391 | 6/1990 | Cameron | 172/78 |

FOREIGN PATENT DOCUMENTS

| | | | |
|---|---|---|---|
| 1020486 | 5/1983 | U.S.S.R. | 15/87 |
| 1516018 | 10/1989 | U.S.S.R. | 172/145 |

OTHER PUBLICATIONS

Farm Show Flyer, vol. 14, No. 1, 1990, 1-16-90.

*Primary Examiner*—Dennis L. Taylor
*Assistant Examiner*—Spencer Warnick
*Attorney, Agent, or Firm*—Max Fogiel

[57] ABSTRACT

A cultivator for such crops as beets, maize, potatoes, etc., planted in rows. A machine frame can be mounted on the three-point hitch of a tractor. Several chopping tools mounted on it, can be detached from tool holders, and are rotated on vertical shafts. Force from a common drive mechanism is distributed to the shafts through a transmission. Each tool is rotated by one shaft and is mounted on a parallelogram. Each chopping tool (20) has one or more brushes that can be secured to the tool holder (18) and that have bristles of a flexible and resilient material and is shaped like an inverted flower pot. A stop (22) that rests against the ground at a level that can be adjusted in relation to the tool is accommodated in the inside (21) of the tool and can be detached from its center.

10 Claims, 4 Drawing Sheets

SOIL-WORKING MACHINE FOR PLANTS GROWN IN ROWS

BACKGROUND OF THE INVENTION

The purpose of the cultivator, according to the present invention, is to cultivate the soil between the rows, destroying the weeds that grow there without injuring the crops in the rows. Such vegetables as beans, peas, etc. can also be cultivated, and not only in the sprouting stage but even when they have arrived at a certain height.

German OS 1 813 079 discloses a cultivator for crops planted in rows in which chopping tools are mounted on vertical shafts, and the shafts and hence the rotated chopping tools are positioned by parallelogram rods suspended from the machine frame. The chopping tools are disks, on which blades that project downward can be mounted interchangeably. The blades of the resulting chopping tools penetrate into the soil, with the total weight of each tool coming into action along with that of the shaft. The disks of course limit the depth of penetration into the soil. The tools are accordingly not resilient and their depth of penetration cannot be controlled. It is also impossible to precisely cultivate some crops, maize for example, near their roots with tools of this type. The disks entail a risk of nicking or otherwise damaging at least the above-ground sections of the stalks. The roots themselves can become damaged by the stationary blades. A relatively wide strip that cannot be cultivated next to the crops is accordingly necessarily left along the row when chopping tools of this type are employed.

Another cultivator is known from German Patent 2 166 742. A common drive mechanism with a transmission that distributes force to various vertical shafts extends over the operating width inside the frame of the machine. The distance between the individual shafts cannot be varied. To adjust to different distances between rows or to rows of different widths, chopping tools are mounted on only some of the tool holders. The pillow block can be detached from the machine frame and shifted laterally to provide the adjustment. The chopping tools are more or less vertical prongs that travel on more or less cylindrical tracks and must be positioned so that they will not damage the plants in the row. Since crops expand as they grow, the strip of soil that cannot be reached with the prongs to the right and left becomes larger, and the weeds that grow there can also not be taken care of. Another drawback is that the depth of penetration of the individual chopping tools between the rows cannot be established separately, and, when the ground is undulatory, some of the prongs can penetrate too far into the soil and in some circumstances damage the roots of the crops, while the prongs will not even reach to the surface of the soil in other areas.

SUMMARY OF THE INVENTION

The object of the present invention is to improve or provide a cultivator of the aforesaid type that will adapt individually and better to the cultivation of crops planted in rows. Of particular importance is the prevention of uncultivated strips and the capability of working very close to the row, so that even weeds growing among the crops can be eliminated, extracted, or damaged.

This object is attained in accordance with the invention by providing that each chopping tool rotated around a vertical shaft is mounted on and guided by its own separate parallelogram rather than directly on and by the machine frame, making it possible to raise and lower each knife on the cultivator independent of the others. The chopping tools, which can be detached from their holders and replaced, have a special shape, which can be characterized as that of an inverted flower pot. The tools can accordingly rotate around a conical surface or have a down-curving contour. They can even be bent or wavy as long as they are open at the bottom. This particular geometry is based on the recognition that a crop is generally narrower at the base across the direction of cultivation than it is in the vicinity of its crown. Since the plant's foliage etc. makes it wider at these above-ground levels, the tools should not be cylindrical if they are not going to damage the projecting parts of the crops while it is attempted to work as close to the roots as possible. It is on the other hand not important to penetrate far into the soil. It is absolutely satisfactory either to penetrate only slightly into the soil or to more or less slide or skate over the ground and knock down or break up the weeds growing there and extensively impede their further growth. To maintain an individual depth of penetration or tool elevation above the soil, the system of suspending the tools from a parallelogram is supplemented by a stop inside each open-based flower pot. The stop rests against the ground and dictates the level of the tool in relation to the soil. Since this level is determined for each tool individually, even a soil with undulations between the individual rows of crops can be uniformly cultivated. The cultivator can be used not just to crop weeds close, for which purpose tools with resilient bristles are employed, but also to do a certain amount of hilling when vegetables are being cultivated. Depending on the particular tool employed, the soil between the rows can also be loosened to a particular intended depth in a sensible and desirable way. Loosening the soil in this way will also attack the roots of the weeds, resulting in a certain weeding action wherein weeds with shallow roots will be more or less ripped out and tossed aside to dry out on top of the ground. The new device, however, can be used not just for cultivating crops planted in rows. It can also be employed for sweeping yards, squares, and country lanes. Even lawns can be smoothed out and leveled with the device.

The stop can basically be raised and lowered in relation to the chopping tool. This measure not only makes it possible to adjust the depth of penetration of the tools into the soil or to establish their level above the ground, but also more or less determines the desired results. Obviously, the overall position of the stops must be considered in conjunction with the parallelograms. The level adjustment can also be utilized to adapt to different soil characteristics.

Tests have also indicated that it is even possible to advance brushes over the rows of crops overlapping. This can be done by providing the brushes with bristles of a flexible and resilient material. Since crops are usually considerably stronger and have stronger roots than weeds, they will survive being driven over and cultivated again without injury to the crops even though the weeds become damaged. Any dead parts of the crops will of course also be removed. However, this is in no way a drawback.

It is particularly important in conjunction with the aforesaid characteristics for the parallelograms to have one or more springs and a fine-adjustment mechanism for adding weight to or subtracting it from the rotated chopping tool. The weight that the brush and/or any prongs associated with it are subjected to and hence their depth of penetration can accordingly be precisely controlled, and the tool can be individually adapted to soil characteristics and moisture, to the stage of growth of the weeds and crops, and to other parameters. Springs that subtract weight will in this case be employed in particular when the machine is to travel a wide path that includes the crops themselves or when shallow penetration is desired. It will simultaneously be possible then to also operate between the rows of crops and to vary the operating width such that the rotating brushes will just come into contact with the plants. When on the other hand the cultivator is employed to sweep yards, lanes, etc, the springs can be used in a practical way to add weight. It is accordingly possible to employ one and the same spring for both purposes by suspending them from and attaching them to different points. The controls will generally feature a threaded structure for fine-adjusting the springs to the weight of the chopping tool, including its parallelogram. The spring or springs can engage both the rods in the parallelogram and the machine frame, in which case it makes absolute sense for one of the springs' points of articulation to be in the vicinity of the parallelogram on the machine frame or at least not far from that point.

The parallelogram will as a rule pivot on the machine frame only on axes that are at an angle to the direction of travel. For many applications, however, it can make extremely good sense for the parallelogram to also pivot around a vertical shaft. Such a pivoting motion makes sense when cultivating berries, currants for example, or even grapes. The direction of rotation around the horizontal shaft can be established by a spring tensioned toward the crops that are to be cultivated. It accordingly becomes possible not only to work very close to the crops and in contact with them but also in the interval between two bushes or vines and to remove weeds growing there.

The stop in one preferred embodiment of the invention is a hemisphere that is positioned at the center of the tool and can be detached from the tool holder. The hemisphere accordingly rests as it were against the bottom of the shaft that transmits the rotation and is itself rotated to facilitate its travel over the ground. A stop in the form of a hemisphere itself exerts only a slight compacting action on the soil, although it very reliably allows a particular level to be retained. It is also capable to some extent of accommodating the not inconsiderable weight of the parallelogram and of the vertical shafts with the tools and their bearings as well as any additional components of the distributing transmission. The shafts and tools can be activated in many different ways. It is for example possible to exploit a tractor's takeoff shaft and distribute the force to the various shafts by way of various angled and beveled gears. It is, however, also possible to associate an oil-activated hydraulic drive mechanism with each vertical shaft or with each pair of chopping tools for example separated by the distance between two rows and activated by the same mechanism.

The chopping tool on each parallelogram consists of one or more brushes secured to the tool holder. It is practical for the brushes to have a cylindrical surface or serrated edge. It is also possible to employ steel wires or prongs or to use them as ancillaries inside the tool. Even knife-like or spoon-like chopping tools are possible or can be employed as integral components. It is also possible for the brush in a chopping tool to have bristles of different length and/or different material. Bristles of plastic for example have been shown to be practical in conjunction with bristles of steel wire. The stiffer metal bristles penetrate to the desired depth into the soil and tear out the weeds by the roots, whereas the plastic bristles are more flexible and remain at the surface, where they intercept the uprooted weeds and, in one toss, shake them free of adhering soil and deposit them on the ground to dry out to a no longer viable state.

Each parallelogram has at least two parallel rods and two connectors, whereby one connector is secured to the machine frame and the other connector constitutes the bearing for the vertical shaft of a tool holder. Parallelograms in agricultural machinery are in themselves known. What is unique about the present parallelogram is that it constitutes a sufficiently stable unit to accommodate and support a chopping tool and the associated mechanisms that rotate it. The two parallel rods accordingly extend in the operating direction, are of the same length from articulation to articulation, and are connected by connectors that are also of the same length from articulation to articulation. There can also be more than two parallel rods, making the parallelogram larger and more stable.

The cultivator can be adjusted to various distances between rows and/or to rows of various widths either by securing one connector such that it will slide back and forth transversely along the machine frame or by securing the bearing for the vertical shaft such that it will slide back and forth transversely along the rod in the vicinity of the other connector. This makes it possible to position each chopping tool at and allow it to engage its specific site relative to the operating width, allowing for plants of different widths in one row by way of a strip of soil that is not cultivated and also adjusting for different distances between rows for different kinds of crops. The width of the cultivation track between the rows is of course also determined by the dimensions of the chopping tool. The tools can be detached from the tool holders and replaced. Various degrees of wear on the tools, tools that consist of rotating brushes for example, can also be counteracted by readjusting their height.

Each parallelogram can have two pairs of rods, one pair on top of the other pair and connected by the same connectors. The result is a structure that is spatially rigid but yields in the direction of the parallelogram and that extends in the operating direction and is accordingly particularly capable of accommodating forces without buckling laterally as might occur in response to forces deriving from the mechanism that rotates the blade. This parallelogram of course can also be displaced laterally to adapt it to the distance between rows and to the width of the rows. Drive-mechanism components that can be adjusted in length can be especially easily accommodated by a parallelogram of this type.

The chopping tools can be positioned in two or more lines the same distance apart along the row, with the distributing transmission that activates the shafts being introduced line by line by universal joints and telescoping transmission shafts. Longitudinal motion is permitted by the telescoping of the shaft components. This is necessary not only because the cultivator is adjusted to a different inter-row distance or row width, but also because during the normal course of operations each tool can be positioned at a level that differs from that of the other tool. This procedure will be accompanied by constant differentiation in the interval between the two tools that are bridged by the drive mechanisms, meaning that the variability in length will be necessary to ensure the transmission of forces.

To cultivate the interval between two adjacent rows of crops, two rotated chopping tools are separated both along the operating direction and at an angle to it with their tracks overlapping. One tool will accordingly cultivate the soil adjacent to the row while the other simultaneously cultivates the symmetrical area along the other row. The two tracks will overlap along the midline.

BRIEF DESCRIPTION OF THE DRAWINGS

A preferred embodiment of the invention will now be described with reference to the drawings, wherein.

DESCRIPTION OF THE PREFERRED EMBODIMENTS

Figure 1:
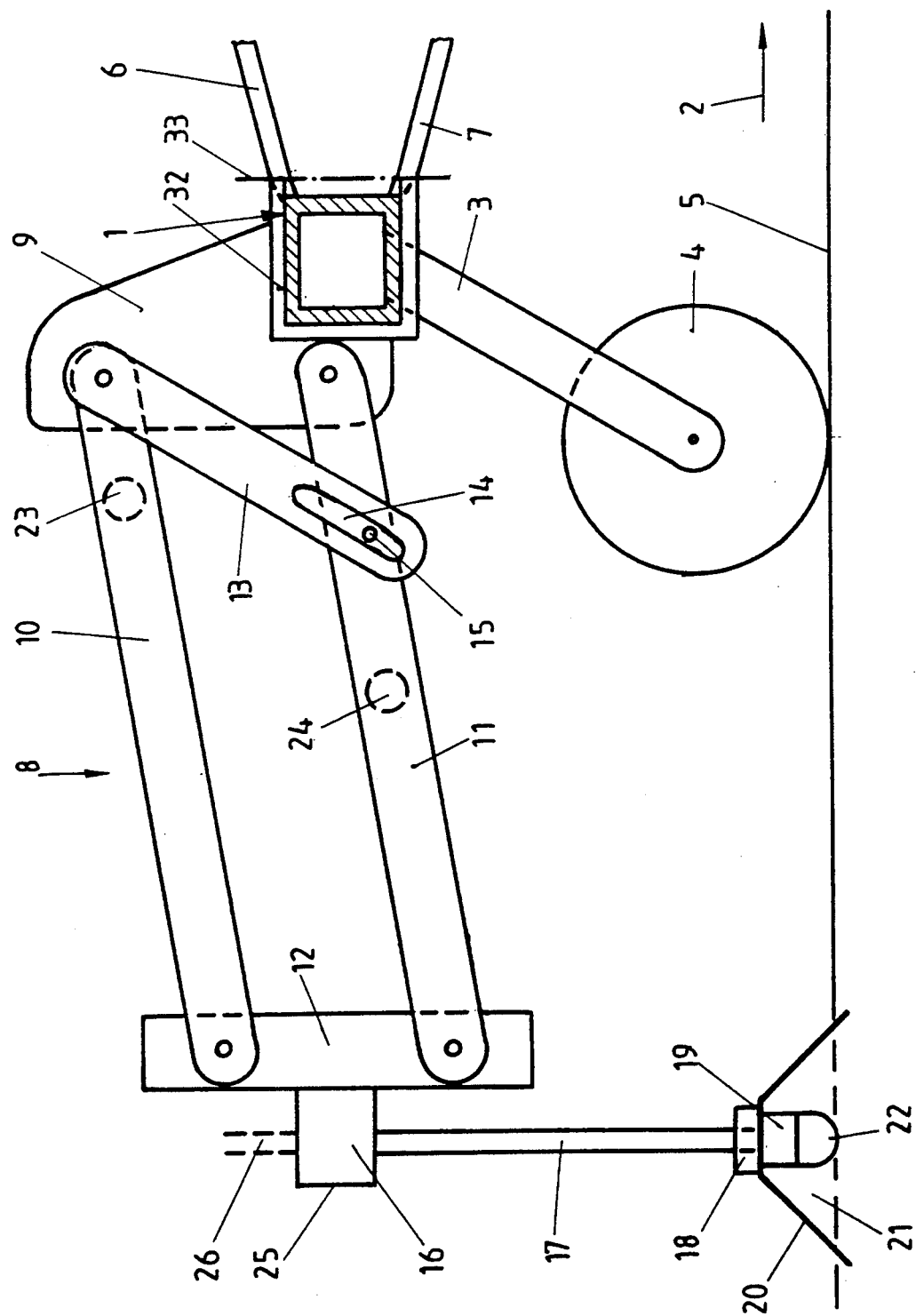
FIG. 1 is a side view of a cultivator, FIG. 2 a top view of a cultivator, FIG. 3 a side view of another version of a cultivator with springs that either add or subtract weight.

The cultivator in FIG. 1 has a machine frame 1 consisting essentially of a length of box section extending across the width of the machine and at a right angle to the direction 2 of travel. Machine frame 1 can have a leg 3 at each of two points along it with a supporting wheel 4 rolling over the soil 5 at the bottom. Also secured to machine frame 1 is a strut 6 that connects it to the upper link and two struts 7 that connect it to the lower link of a three-point tractor hitch.

Figure 2:
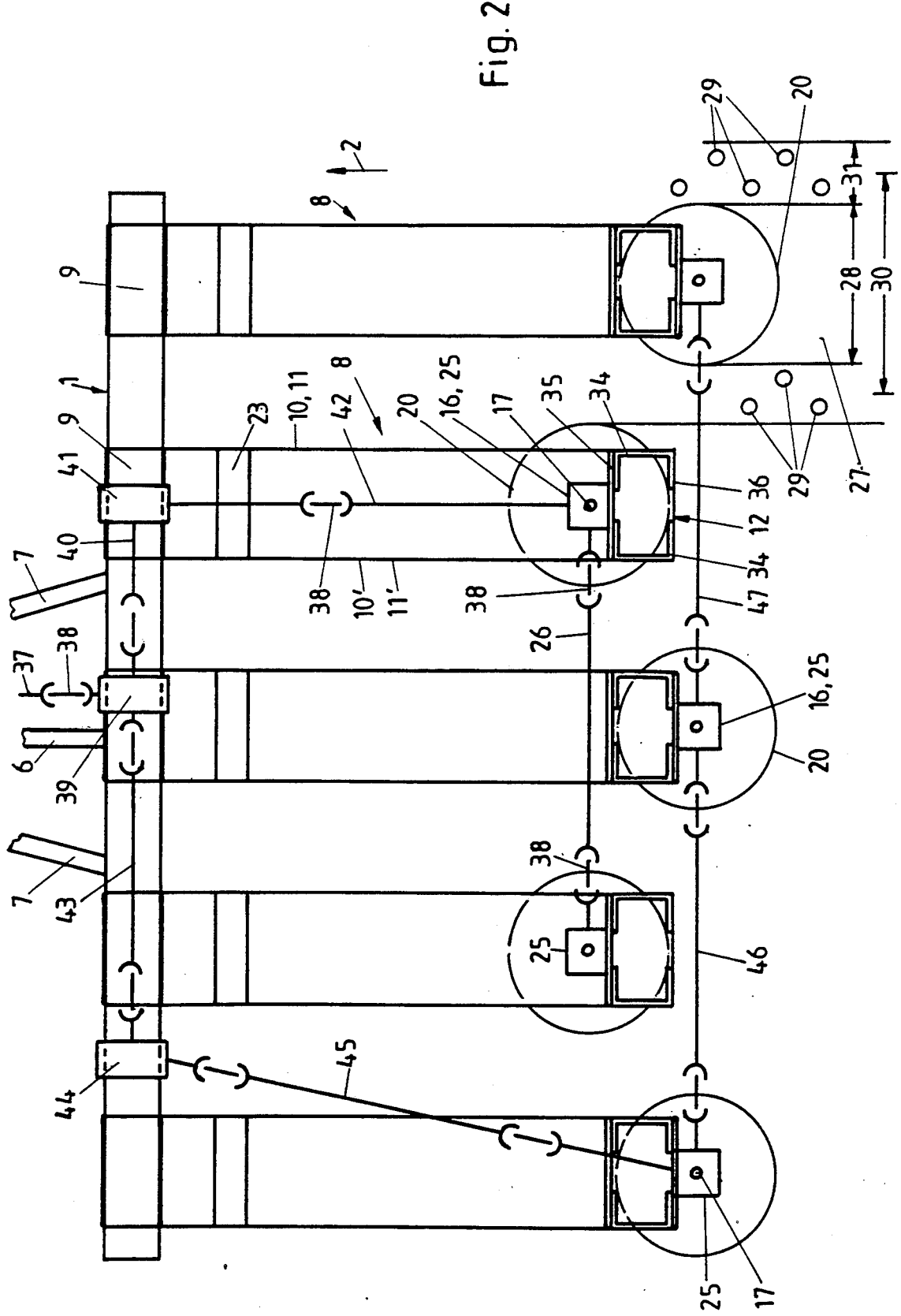

Resting on machine frame 1 is a parallelogram 8 that comprises a forward connector 9 adjacent to the frame, two rods 10 and 11, and a rear connector 12. The components 9, 10, 11, and 12 of parallelogram 8 are articulated together. The two parallel rods 10 and 11 are equal in length from one point of articulation to the other. Since the active lengths of connectors 9 and 12 are also equal, they will remain parallel in all positions of parallelogram 8 on machine frame 1. The rods 10 and 11 in each parallelogram 8 can be in pairs as illustrated in FIG. 2, resulting in conjunction with connectors 9 and 12 in a stable structure. The angle of rotation of parallelogram 8 on machine frame 1 is limited by a strap 13 with a slot 14 that is engaged by a bolt 15 on lower rod 11. Strap 13 can be articulated at the same point on connector 9 as upper rod 10.

On rear connector 12 is a bearing 16 for an essentially perpendicular shaft 17 to rotate in. At the bottom of shaft 17 is a tool holder 18. A chopping tool 20 is secured to the holder by threads 19 and can accordingly be detached from it and replaced. Chopping tool 20 is shaped like an inverted flower pot open toward soil 5 and can preferably be a conical brush. Chopping tool 20 can, however, also be in several parts, and consist of several nested brushes. Spoon-shaped, rod-shaped, and bladed tools can also be employed in this location. What is essential is the essentially inverted flower-pot shape open at the bottom. The result is an inside 21 that accommodates a stop 22, which can also act as a cap that screws onto threads 19. Stop 22 can be a hemisphere and is rotated along with shaft 17. It rests against the ground and determines the operating level or depth of penetration of chopping tool 20 into soil 5.

When rods 10 and 11 are in separate pairs, they can be stiffened by rings 23 and 24 connectors 9 and 12 extend across the distance between the two rods.

Bearing 16 can also be an angled transmission 25 wherein the rotation is transmitted by way of an intermediate shaft 26 that parallels machine frame 1 along some of its operating width and is only indicated for purposes of identification in FIG. 1.

Although for simplicity's sake only the side view of a single assembly of parallelogram 8, more or less vertical shaft 17, and chopping tool 20 is illustrated in and described with reference to FIG. 1, it will be obvious that several such assemblies can be distributed along machine frame 1 as illustrated in FIG. 2. Each chopping tool 20 cultivates a strip 27 that is as wide as the tool's effective diameter 28 and that is adapted to the distance between rows of crops. The rows of maize plants 29 in this case have been sown at an angle with a mean distance 30 between rows. The width 31 of a row represents an area of soil 5 that is not to be cultivated. The situation is the same when the plants are sown or set out in single rows instead of in double rows as illustrated. It will accordingly be apparent that the individual cultivating assemblies, consisting essentially of a parallelogram 8 and of a chopping tool 20, must be capable of being adjusted to between-rows distance 30 and to row width 31. This can be done on the one hand by shifting the connector 9 in each assembly along machine frame 1. Each connector 9 can have a shoe 32 that is associated with a tensioning screw 33. Once screw 33 has been unscrewed, its associated connector 9 can be shifted along machine frame 1 on shoe 32 and secured in its new position by tightening the screw again. Instead of or in addition to the lateral displacement of the connector itself, bearing 16 and angled transmission 25 can also be shifted along rear connector 12. This design allows adjustment to between-rows distance 30. The cultivator is adjusted to row width 31 by employing chopping tools 20 of the desired diameter or by positioning several mutually offset tools along the direction 2 of travel, with at least two tools operating between each pair of rows of plants 29.

The various assemblies of parallelogram 8, vertical shaft 17, and chopping tool 20 can be distributed along machine frame 1 at a right angle to the direction of travel as illustrated in FIG. 1. It is, however, also possible, as illustrated in FIG. 2, to position chopping tool 20 in two lines. Every other parallelogram 8 in each assembly illustrated in FIG. 2 is identical in design. Each parallelogram has a forward connector 9 with two pairs 10 and 11 and 10' and 11' of rods. All of these rods can be identical in design. The rear ends of all four rods meet at a common connector 12 that, as will be evident from the figure, consists of two length 34 of U section and two plates 35 and 36, which can also be identical in design. It will be evident that the bearings 16 for vertical shaft 17 and angled transmission 25 are mounted alternately on forward plates 35 and rear plates 36 along the operating width. The lines of chopping tools 20 will accordingly be separated along direction 2 of travel.

There are various approached to embodying the mechanism that drives each vertical shaft 17 along with its associated chopping tool 20. It is for example possible to position an oil-activated hydraulic mechanism on each bearing 16 and to operate the mechanisms from a central pump by way of appropriate lines. FIG. 2 illustrates a drive mechanism that drives power from a take-off shaft 37 on a tractor. Torque is communicated through a universal joint 38 to a transmission 39 that distributes force to the right and left line by line. The line of chopping tools 20 that is in front along direction 2 of travel is connected by way of an intermediate shaft 40 consisting of several telescoping segments and associated universal joints to an angled gear 41 that is preferably secured to the forward connector 9 of the particular assembly. At the output end is another intermediate shaft 42 with associated universal joints 38 that forwards force to angled transmission 25, activating the chopping tool 20 in this assembly. The angled transmission 25 in this version has another output from which the intermediate shaft 26 with universal joints 38 leads to chopping tool 20 to the left and in the same line in FIG. 2. At this point is another angled transmission 25, which has, however, only one output and activates the shaft 17 at that location.

The second row of chopping tools 20 has two assemblies. Force is transmitted to the left by way of distributing transmission 39 in association with an intermediate shaft 43 and angled transmission 44 and then by way of another intermediate shaft 45 to another angled transmission 25 that is secured to a rear plate 36. Hence another intermediate shaft 46 leads to the angled transmission 25 in the middle assembly and then by way of an intermediate shaft 47 to the angled transmission 25 in the assembly farthest to the right. Obviously, all the intermediate shafts consist of telescoping components with associated universal joints 38, allowing the assemblies of parallelogram 8, vertical shaft 17, and chopping tool 20 to move individually although they are activated jointly. The telescoping capability of the intermediate shafts is necessary to allow them to adjust to different distances between assemblies and hence to different between-rows distances 30.

It will be evident that shafts 17 are essentially vertical. The precise orientation, however, depends on how struts 6 and 7 are positioned in relation to each other by the tractor's three-point hitch. It is accordingly absolutely possible for shaft 17 too slope slightly away from the vertical to allow chopping tool 20 to penetrate slight farther into soil 5 in front as they rotate. Since chopping tools 20 can be detached and replaced, different types and combinations of tools can be attached to any shaft 17 in accordance with the particular procedure being carried out. The flower-pot shape makes it possible to operate very near the plants without damaging any foliage that arches out. The direction and speed of rotation can of course also be adapted to the particular results desired. Chopping tools 20 that have relatively flexible and resilient bristles and rotate relatively rapidly will produce a close-cropped effect, meaning that weeds will be mowed off directly at ground level without any actual cultivation occurring. If penetration into the soil is desired, it is recommended to use, at least along with flexible bristles, somewhat more rigid, prong-like components on the tools.

Figure 3:
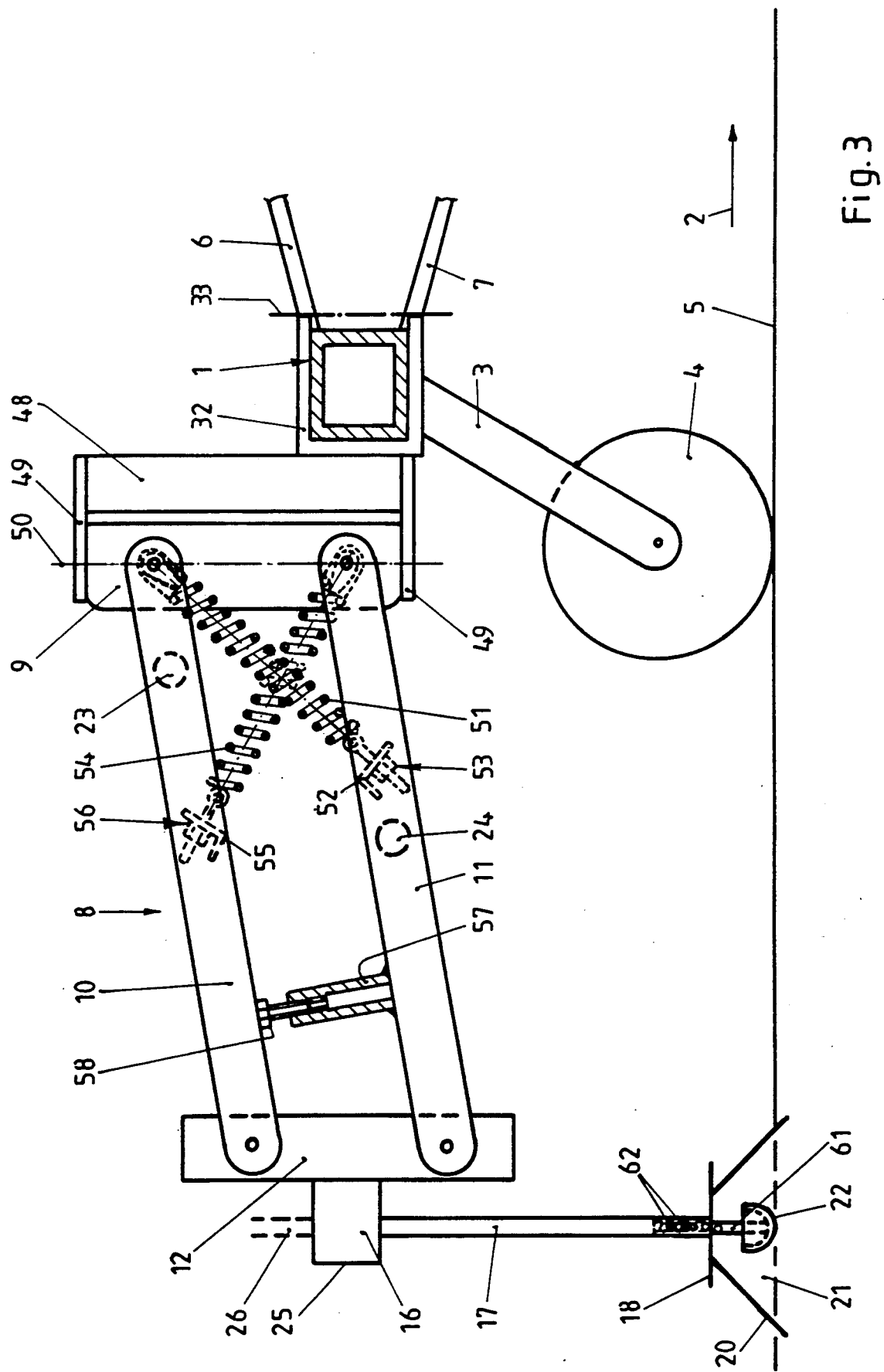

FIG. 3 is a view like that in FIG. 1, except that some parts of the cultivator are different. Resting on machine frame 1 is an upright 48 with two arms 49 that accommodate connector 9 between them. Arms 49 constitute a bearing for connector 9, which pivots on a vertical axis 50. Since overall parallelogram 8, including chopping tool 20, also accordingly pivots on axis 50, it can deflect at an angle to direction 2 of travel. This rotary bearing can also be subjected to tension along the direction that it pivots in by an unillustrated spring that adjusts and activates the tools and guides them around certain types of crops, vines for example.

FIG. 3 also illustrates a spring 51 suspended on machine frame 1 or from the connector 9 in the rotary bearing for upper rod 10 for example with its other end engaging an angle iron 52 between rods 11. Spring 51 acts as a weight-reduction device and makes it possible to fine-adjust the pressure and the depth of penetration of chopping tool 20. A setting mechanism 53 has a threaded rod that extends through a perforation in angle iron 52 with the end of spring 51 secured in its eye. Associated with the threaded rod is a nut that makes it possible to precisely vary the tension on spring 51. It is of course possible to use several parallel springs instead of just one. The other spring bearing or its associated support need not necessary be at the point of articulation of rod 10 to connector 9. It will be sufficient for it to be in the vicinity of that point or for the line of force of spring 51 to extend such as to reduce the weight of the chopping tool 20 on machine frame 1.

Instead of spring 51 it is also possible to use a spring 54 that extends from the point of articulation of lower rod 11 to an angle iron 55 between the two upper rods 10 and that can also carry out the function of and replace reinforcing ring 23. This embodiment also employs a setting mechanism 56 similar to setting mechanism 53 and allowing the precise variation of the tension of spring 54, with the object of adding to rather than subtracting from the weight on chopping tool 20, however. Springs 51 and 54 do not necessarily have to separate. It is also possible to employ only one spring or to employ two springs mounted and tensioned in each of the illustrated positions as necessary. It will be evident that the arrangement of springs 51 and 54 will be independent of whether connector 9 is rigidly secured to machine frame 1 or pivots on vertical axis 50. Instead of with strap 13, the extent of pivoting motion on lower rod 11 can be limited with a welded-on threaded cylinder 57 engaged by a screw that limits the downward pivot.

Figure 4:
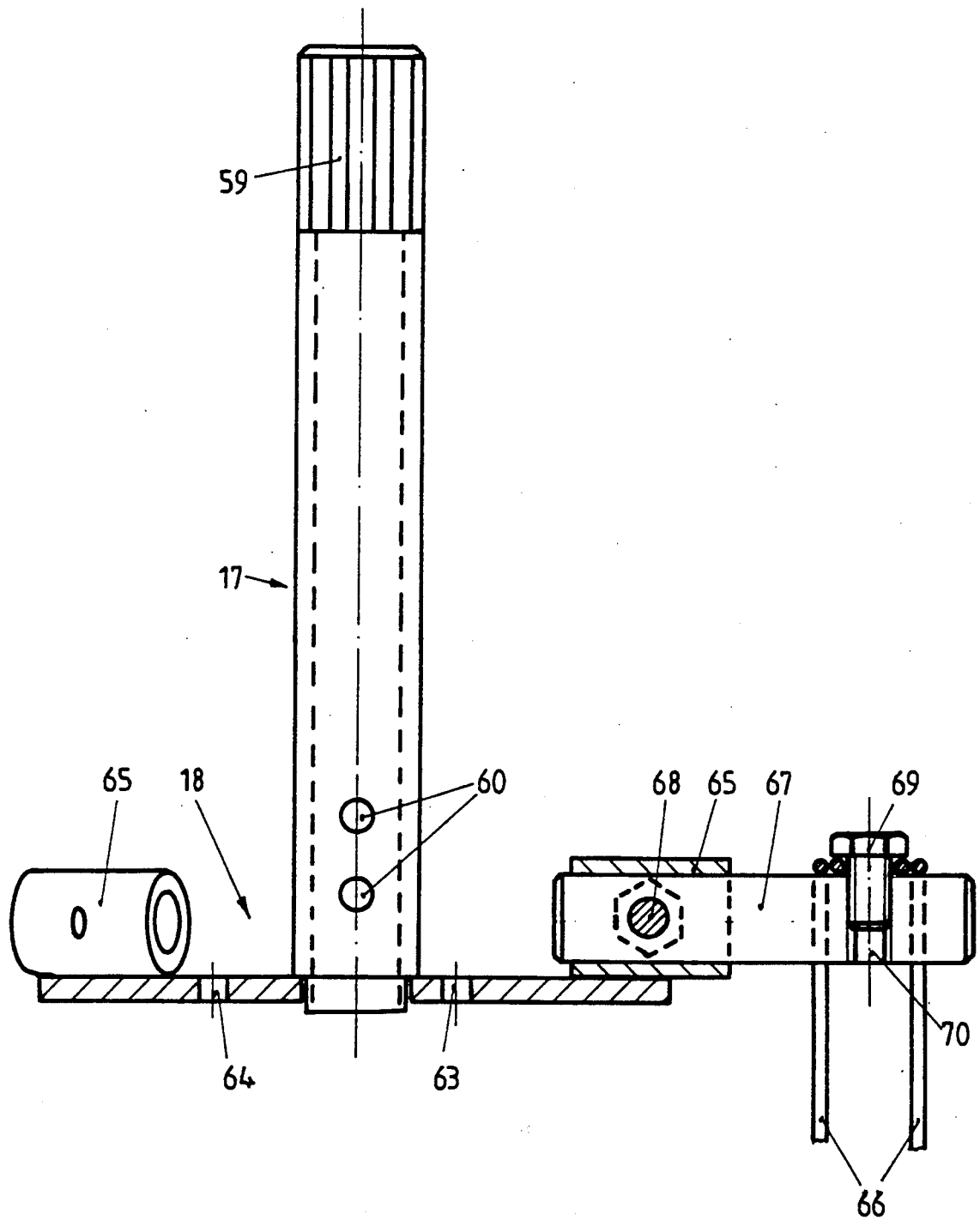
FIG. 4 is a magnified detail of a tool holder.

It will be evident from FIG. 3 that the chopping tools can be designed and mounted in various ways. As will be even more evident from the magnified detail in FIG. 4, tool holder 18 can be a flat plate welded to the bottom of shaft 17. The shaft itself is a hollow cylinder with groove-like depressions 59 at the top to transmit the rotation. At the bottom are two separated transverse holes 60 that constitute a component of the mechanism for setting the level of stop 22. Stop 22 is a hollow hemisphere with a cylindrical section 61 that telescopes into shaft 17. Cylindrical section 61 has transverse bores 62, one above the other. An unillustrated bolt can be forced through one transverse hole and one transverse bore to establish the height of the stop. Since transverse holes 60 are approximately 1½ times as far apart as transverse bores 62, the level can be established at very short increments.

The disk in tool holder 18 has three different holes 63 and 64 at two different diameters for securing brushes or chopping tools 20 as shown in FIG. 3. Equally distributed around the upper surface of the disk at angles of 120° (not seeable in this view) are three cylindrical sections that accommodate bolts 67 for securing double prongs 66 with nuts 68 when they are employed. Bolts 67 extend outward to some extent and secure the double prongs or single points that can be positioned and adjusted with screws 69. The screws facilitate replacement of prongs 66 when worn. When prongs are not being employed, bolts 67 are also removed from sections 65 to prevent injuring growing plants in their vicinity. Screws 69 engage threaded holes 70, several of which can be distributed over the length of bolt 67 to vary the diameter at which prongs 66 revolve, which can for example be the diameter of a brush.

I claim:

1. A cultivator for crops such as beets, maize, potatoes and similar crops, planted in rows in ground comprising: a machine frame mountable on a three-point hitch of a tractor; a plurality of chopping tools mounted on said machine frame; tool holders rotatable on vertical shafts, said chopping tools being detachable from said tool holders; common drive means for driving said shafts at substantially high speeds; transmission means between said drive means and said shafts, force from said drive means being distributed to said shafts through said transmission means; each chopping tool being rotated by one shaft and being mounted on a parallelogram; each chopping tool having at least one brush securable to one of said tool holders; said brush having bristles of flexible resilient material; said chopping tool having a frustoconical shape with an inside space; stop means within said inside space and resting against the ground at an adjustable level; said stop means being hemispherically shaped and exerting slight compacting action to the ground; means for adjusting said level relative to the chopping tool, said stop means being detachable from a center of the said chopping tool, said chopping tools being out of contact with said crops.

2. A cultivator as defined in claim 1, including at least one spring on said parallelogram; and fine-adjustment means for adding weight to said chopping tool or subtracting weight from said chopping tool.

3. A cultivator as defined in claim 2, wherein said parallelogram has rods engaged by said spring, said spring engaging also said machine frame.

4. A cultivator as defined in claim 1, wherein said parallelogram pivots about a vertical axis.

5. A cultivator as defined in claim 1, wherein said bristles have different lengths and different materials dependent on penetration of said bristles into the ground.

6. A cultivator as defined in claim 1, wherein said chopping tool has steel wires in addition to a brush.

7. A cultivator as defined in claim 1, wherein each parallelogram has at least two parallel rods and two connectors, one of said connectors being secured to said machine frame, and the other one of said connectors comprising a bearing for the vertical shaft of a tool holder.

8. A cultivator as defined in claim 9, wherein each parallelogram has two pairs of rods, one pair of rods being located on the top of the other pair of rods and connected by the same connectors.

9. A cultivator as defined in claim 1, wherein the cultivator has an operating direction; two chopping tools being separated along said operating direction and at right angles to said operating direction and having overlapping tracks for cultivating an interval between two adjacent rows of crops.

10. A cultivator for crops such as beets, maize, potatoes and similar crops, planted in rows in ground comprising: a machine frame mountable on a three-point hitch of a tractor; a plurality of chopping tools mounted on said machine frame; tool holders rotatable on vertical shafts, said chopping tools being detachable from said tool holders; common drive means for driving said shafts at substantially high speeds; transmission means between said drive means and said shafts, force from said drive means being distributed to said shafts through said transmission means; each chopping tool being rotated by one shaft and being mounted on a parallelogram; each chopping tool having at least one brush securable to one of said tool holders; said brush having bristles of flexible resilient material; said chopping tool having a frustoconical shape with an inside space; stop means within said inside space and resting against the ground at an adjustable level; said stop means being hemispherically shaped and exerting slight compacting action to the ground; means for adjusting said level relative to the chopping tool, said stop means being detachable from a center of the said chopping tool, said chopping tools being out of contact with said crops; at least one spring on said parallelogram; fine-adjustment means for adding weight to said chopping tool or subtracting weight from said chopping tool; said parallelogram having rods, said spring engaging said rods and said machine frame; said parallelogram pivoting about a vertical axis; said stop means having a shape of a hemisphere; said bristles having different lengths and different materials dependent on penetration of the bristles into the ground; said chopping tool having steel wires in addition to said brush; each parallelogram having at least two parallel rods and two connectors, one of said connectors being secured to said machine frame and the other one of said connectors comprising a bearing for the vertical shaft of a tool holder; each parallelogram having two pairs of rods, one pair of rods being located on top of the other pair of rods and being connected by the same connectors; two chopping tools being separated both along an operating direction of the cultivator and at right angles to said operating direction and having overlapping tracks for cultivating an interval between two adjacent rows of crops.

* * * * *